F. M. BROOKS.
INVERTED MANTLE LAMP.
APPLICATION FILED JUNE 7, 1910.
978,133.
Patented Dec. 13, 1910.
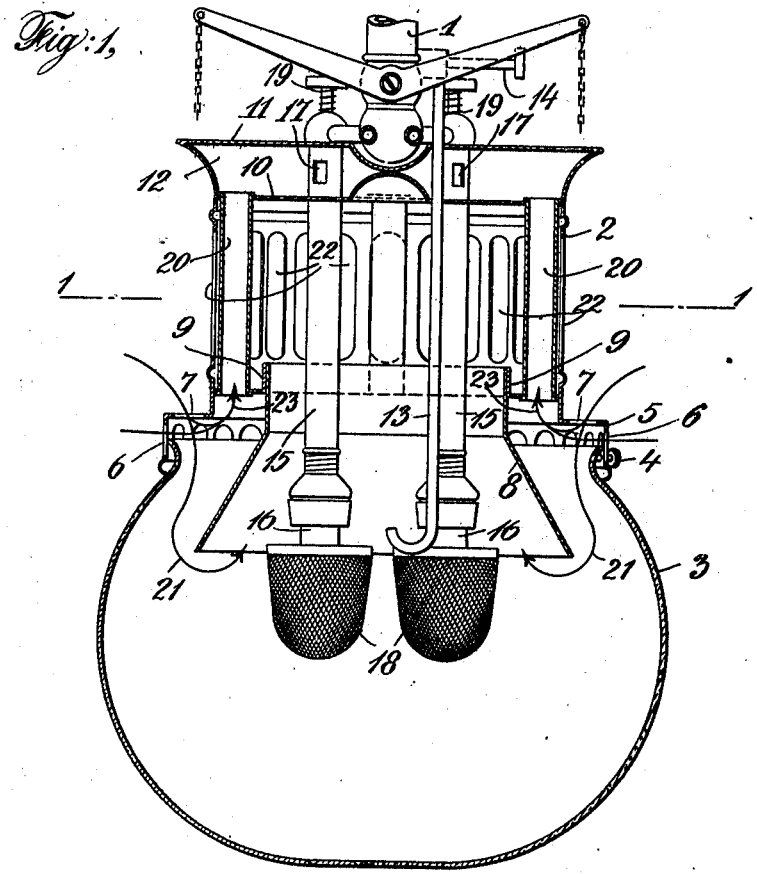
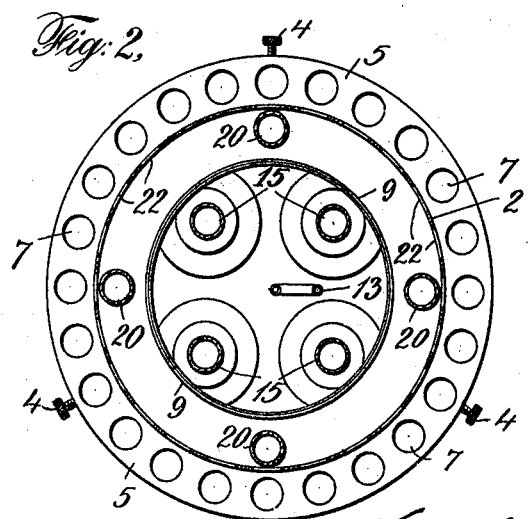
Witnesses:
Max B. Doring
F. M. Dousbach
Inventor
Frank M. Brooks
By his Attorney
Phillips Abbott

UNITED STATES PATENT OFFICE.

FRANK M. BROOKS, OF NEW YORK, N. Y.

INVERTED-MANTLE LAMP.

978,133.  Specification of Letters Patent.  Patented Dec. 13, 1910.

Application filed June 7, 1910. Serial No. 565,568.

*To all whom it may concern:*

Be it known that I, FRANK M. BROOKS, a citizen of the United States, and a resident of the borough of Brooklyn, county of Kings, city and State of New York, have invented certain new and useful Improvements in Inverted-Mantle Lamps, of which the following is a specification, reference being had to the accompanying drawings, in which—

Figure 1 illustrates a vertical sectional view of the invention, the interior parts of the lamp being shown in elevation; Fig. 2 illustrates a plan view in section taken on the line 1—1 of Fig. 1.

This invention relates to an improvement in inverted mantle lamps, the parts of which can be assembled readily and economically and which will permit interchanging of the parts, thus contributing to prompt and inexpensive repair, if such be necessary, whereby also the various parts may be readily cleaned.

The invention is adapted to lamps having any preferred number of burners and a very important feature in the construction is an air chamber located in the upper part of the lamp, in which air chamber the air inlets in the Bunsen burner tubes are located, and connected with this air chamber are pipes or equivalent conduits for conveying air thereto, said tubes being so arranged as to convey only fresh air, rich in oxygen, to the chamber and thence to the Bunsen burner tubes. The air chamber has attached to it at or near its upper part gas inlets for the several Bunsen burners which may or may not be fitted with regulating needle valves, as preferred.

In the construction of lamps of this character, efforts have heretofore been made to dispose of the products of combustion resulting from the burning of the gas, so that such products will not be drawn into the Bunsen tubes, since they are unfit for further combustion and impair the operation of the lamp. Most efforts of this kind, so far as I am aware, have been only partially successful.

During a series of experiments I have discovered that an air chamber entirely closed can be located in the heated zone of the lamp, and if air pipes or conduits be so arranged as to convey fresh air, (that is, air not contaminated with the products of previous combustion and consequently rich in oxygen, even if such air should be highly heated) to the air chamber and the Bunsen tubes be connected with the interior of said chamber, that then the supply of air for admixture with the incoming gas being rich in oxygen and free from the objectionable products of the previous combustion, a greatly improved light at the burners will result. I have also discovered that when a globe entirely closed at the bottom is used on a lamp of this description in conjunction with an interior funnel, that then the air pipes or conduits above referred to, if made to receive the fresh air from the space between the globe and the funnel, insure a steady supply of uncontaminated air, because the funnel causes all of the foul air to rise and escape from the lamp above the inlet of the fresh air and there is no way by which it can be drawn back into the globe chamber again. Locating the lower end of the air conduits in the globe chamber also prevents the fresh air supply being affected by wind drafts, thus insuring steadiness of the light. There are other makes of lamps of this general character, which have the fresh air supply in various forms drawn from outside the lamp but immediately above the globe chamber. They have the disadvantage of sometimes drawing in some of the contaminated air and being subject to wind drafts, causing unsteadiness in the light. The location of the lower end of the air conduits in a space between the globe and an interior funnel distinguishes my lamp from any other, so far as I know.

Referring to the drawings hereof, 1 represents the usual screw threaded connection whereby the lamp may be connected with the gas pipe, 2 the hood of the lamp, 3 the globe which is continuous throughout, that is to. say, it has no opening below, 4 the usual thumb screws whereby the globe is held to an outwardly projecting part 5 of the lamp structure, as shown.

6 and 7 are series of holes made in the part 5.

8 is a cylindrical funnel the lower part of which flares outwardly as shown. It is connected at its upper edge to an annular ring 9 which closes the space between the hood 2 of the lamp and the upper part of the funnel.

10 is a partition which extends across the upper part of the lamp and together with another partition 11 at the upper rim of the lamp constitutes a comparatively tight chamber 12 in the upper part of the lamp.

13 is the usual pilot light tube provided with needle valve 14.

15 are the Bunsen burner tubes provided with vitrified or equivalent mantle holders 16 and with air inlet ports 17, the latter being located in the chamber 12. 18 are the mantles. The Bunsen burner tubes are preferably provided with the usual gas regulating valves or cut offs 19.

20 are air pipes or other suitable air conduits which open through the ring 9 immediately above the holes 7, extend upwardly and pass through the partition 10 and open into the chamber 12.

It will be noted that the air which enters through the holes 6 and 7 will follow two courses, one, that indicated by the arrows 21, in which it passes downwardly and around the lower edge of the flaring funnel and supplies air for the proper combustion of the gas on the outside of the mantles and rising thence, passes out of the lamp through the openings 22 made in the lamp body or hood, as usual. The other course taken by the air is indicated by the arrow 23, in which after entering through the holes 6 and 7, it passes upwardly through the pipes, or equivalent air ducts 20, and is discharged into the chamber 12, from which it is drawn into the Bunsen tubes through the openings 17 therein, and thence passes downwardly to the burners on the lower end of the tubes.

Although I prefer that the structure should embody the ring 9, and that the air pipes or conduits 20 should extend through openings made in this ring, so as to make direct connection with the space between the globe and the funnel 8, nevertheless it is not essential that this construction should be adhered to, because if the pipes or conduits 20 open into the space between the funnel and the globe, the upper part of which space is between the upper part of the funnel and the hood of the lamp, or if the pipes or conduits extend downwardly only so far as that their lower ends shall be adjacent to but above openings made in the ring, if it be present, still measurably satisfactory results will follow because the upward rush of the products of combustion through the funnel and out through the openings 22 in the hood is such that under ordinary conditions, among them those in which the lamp is not subjected to pronounced air drafts, there will be little, if any, of the products of combustion drawn into the pipes or conduits, 20.

It will be seen that by my invention I accomplish the following desirable results, partly referred to above.

First: The burners are supplied with fresh air rich in oxygen and free from products of combustion.

Second: The globe of the lamp has no opening in it. This is a very desirable feature not only for the reasons above stated, but also that the mantles, if dislocated or broken, cannot fall through the globe, which would be the case if it had an opening in its bottom.

Third: The pilot light is protected against all influences which might extinguish it.

Fourth: The location of the pipes or conduits which supply the fresh air to the air chamber being near the outer wall of the hood of the lamp, space is afforded in which a funnel may be placed nearer the center of the hood, whereby the air currents are controlled and directed as described, and the perforations at the side of the hood permit the escape of the heat generated by the lamp, without affecting the air chamber. This is an important feature of the invention.

Fifth: The air pipes being located so that their lower ends open into the quiet and protected space between the globe and the funnel, wind drafts or air currents cannot affect, either to increase or reduce, the supply of air, thus maintaining a steady light.

Lastly: The construction is unusually practical and economical for a lamp of this class.

It will be obvious to those who are familiar with such matters that the details of construction described and illustrated by me may be very extensively departed from and still the essentials of my invention be availed of. I therefore do not limit myself to such details.

I claim:

In an inverted mantle lamp, a body part or hood, a continuous globe, a funnel inside of but separated from the globe, the body part or hood having air inlet holes opening into the space between the globe and the funnel, and outlets for the products of combustion immediately above the top of the funnel, a closed chamber in the upper part of the hood, Bunsen burner tubes located inside of the funnel, the air inlet ports of which are within the chamber, means to confine and to conduct pure air from the space between the globe and the funnel to the chamber, and gas supply pipes for each Bunsen burner tube outside of the lamp.

In testimony whereof I have signed my name to this specification in the presence of two subscribing witnesses.

FRANK M. BROOKS.

Witnesses:
 FLORA M. DONSBACH,
 CORNELIUS P. MCLAUGHLIN.